May 4, 1965
C. O. DAMITZ
3,181,642
CURVED PROPELLER SHAFT ROTATABLY SUPPORTED ON A SEALED
PLASTIC HOUSING CONTAINING A LUBRICANT
Filed Dec. 31, 1959
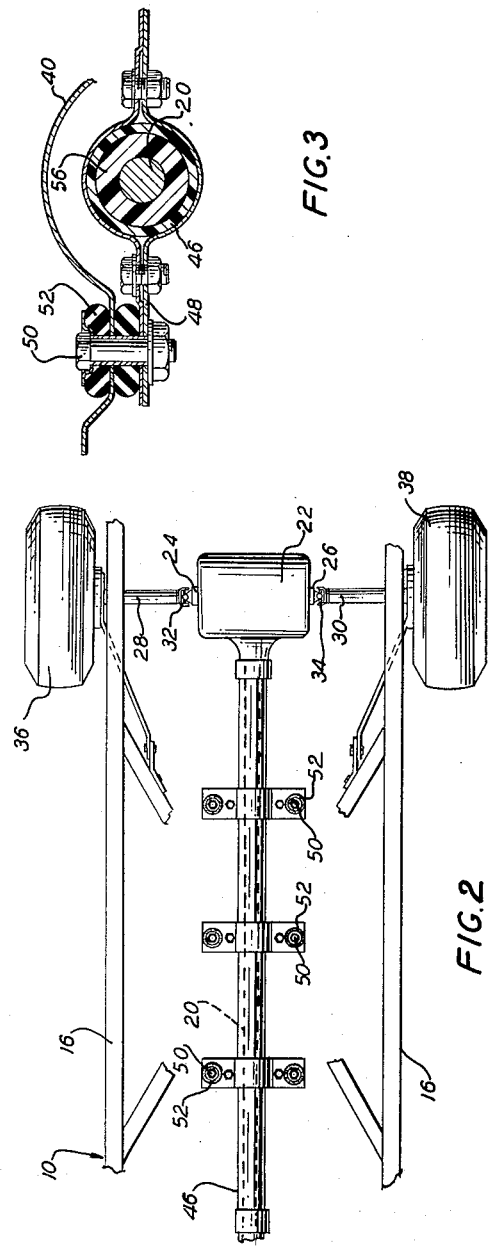
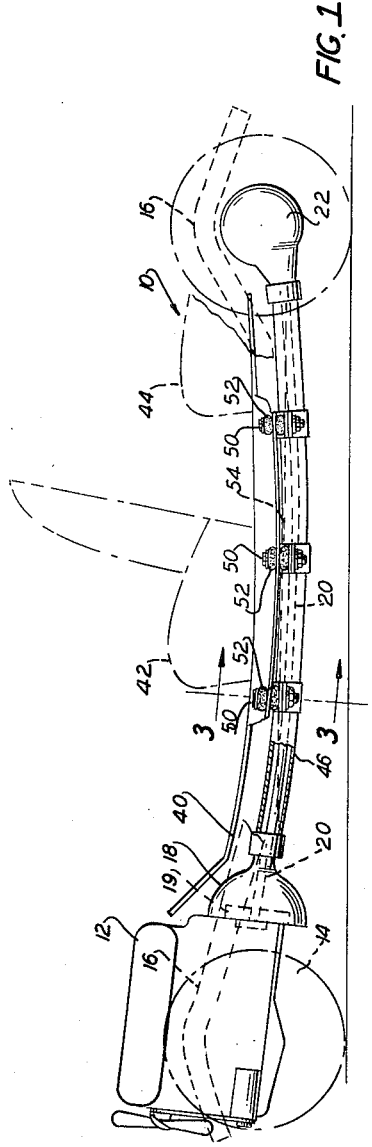
CLYDE O. DAMITZ
INVENTOR.
BY John R. Faulkner
Clifford L. Sadler
ATTORNEYS and more particularly to a solid flexible driveshaft.

United States Patent Office 3,181,642
Patented May 4, 1965

3,181,642
CURVED PROPELLER SHAFT ROTATABLY SUPPORTED ON A SEALED PLASTIC HOUSING CONTAINING A LUBRICANT
Clyde O. Damitz, Southfield, Mich., assignor to Ford Motor Company, Dearborn, Mich., a corporation of Delaware
Filed Dec. 31, 1959, Ser. No. 863,190
1 Claim. (Cl. 180—70)

The present invention relates to a driveshaft for motor vehicles and more particularly to a solid flexible driveshaft.

In the present state of the automotive art, it is considered highly desirable for style and safety reasons to provide an automobile having the lowest possible profile. When the roof of a new car is designed to a lower height, consideration must be given to passenger comfort, such as, providing adequate head room. Thus, as the roof is lowered, the seats and the floor pan upon which the seats rest must also be lowered a corresponding amount.

In the conventional vehicle having a front mounted engine and rear wheel drive, the driveshaft extends rearwardly from the engine to the rear axle. A longitudinally extending tunnel is integrally formed in the floor pan to accommodate the driveshaft. In order to lower the floor pan, it is also necessary to lower the driveshaft so that the tunnel within the passenger compartment will not be excessively large.

It is therefore an object of the present invention to provide a driveshaft which may be disposed in the lowest possible position beneath the passenger compartment, and, have a tunneled floor pan in association therewith which will not unduly encroach upon the foot room of the passengers.

More specifically the present invention provides a novel flexible driveshaft for a motor vehicle having a front mounted engine and rear wheel drive, which is interposed between the engine output and the rear axle. This new driveshaft is bowed below the passenger compartment portion of the floor pan and is disposed in a tubular casing.

These and further objects of the present invention will become more apparent from the following detailed description and the accompanying drawing, wherein:

FIGURE 1 is a side elevation view of the chassis portion of a motor vehicle having the present invention incorporated therein.

FIGURE 2 is a top plan view of a portion of the chassis shown in FIGURE 1.

FIGURE 3 is a sectional view taken along section lines 3—3 of FIGURE 1.

Referring now to the drawing for a more detailed description wherein like numerals identify like parts throughout the various views, a chassis 10 of a passenger automobile is shown in FIGURE 1 which illustrates the preferred embodiment of this invention. The chassis 10 is provided with a forwardly disposed internal combustion engine 12 which is substantially centrally located with respect to a pair of conventional front wheels 14. The front wheels 14 and engine 12 are supported on the vehicle's frame 16. While the present invention is shown in a vehicle having a conventional separable frame, it is also obvious that it is equally adaptable to vehicles constructed with integral frames or where body sheet metal is formed as a frame substitute.

Connected to the rear of the engine is a bell housing 18 that contains a clutch 19 which may be of either the dry plate or fluid type. Joined to the output of clutch 19 is a solid metal driveshaft 20 which extends from the bell housing 18 to a combination transmission, differential and axle unit 22 located at the rear end of the vehicle and secured to the chassis frame 16. Unit 22 is generally known as a "trans-axle" and is provided with right and left outputs 24 and 26 which are connected to half-axles 28 and 30 by means of universal joints 32 and 34. Driving wheels 36 and 38 are disposed on the outermost ends of the swing axles 28 and 30.

The frame 16 supports a floor pan 40 for the passenger compartment. The floor pan 40 carries front and rear passenger seats 42 and 44 which are shown in dotted line form.

So that the floor pan 40 may be situated as low as possible, driveshaft 20 of the present invention is formed of a relatively flexible metallic material, permitting it to be of arcuate or bowed configuration. From FIGURE 1 it will be noted that the central portion of the shaft 20 is situated lower than its extreme ends which are connected to the clutch 19 and the trans-axle 22. For structural reasons the shaft is solid.

The driveshaft 20 is contained within a tubular housing 46 which is resiliently mounted to a structural portion of the vehicle such as the floor pan 40 or frame 16. Referring to FIGURE 3, the mounting means include a bracket 48 which surrounds the housing 46 and bolts 50 which joins the bracket to the floor pan 40. Rubber blocks 52 having a generally doughnut shape are employed in the mounting for purposes of isolating road noises. The tubular housing 46 is of completely sealed construction and may be partly filled with a lubricating fluid as indicated by the dotted lines 54 in FIGURE 1.

Bearing means are provided at each of the mounting brackets 48 for supporting and positioning the arcuate driveline 20. These bearings may take the form of a simple bushing such as that indicated by reference numeral 56.

Because the housing 46 for the driveline and the bushings 56 do not carry any substantial load, they may be formed of a non-metallic or hardened plastic material such as a phenolic resin reinforced with fiber glass. It is intended that the load carrying bearings for the shaft 20 be situated within the bell housing 18 and the trans-axle 22.

A motor vehicle having a driveline constructed in accordance with the present invention, may be designed to have a lower than conventional roof line height but still provide adequate head room for the passengers and only a moderately size tunnel. Because of restrictions as to the absolute minimum clearance between the engine and the ground and between the trans-axle and the ground their respective outputs and inputs cannot be lowered. However, with the present design a lower than normal floor pan may be fitted to the vehicle without an unusually large tunnel. This is possible because the driveshaft 20 and its tubular housing 46 is formed with an arcuate configuration having its central portion of substantially less height than its ends which join the clutch and trans-axle. Thus, the floor pan and the passenger seats which are situated on the floor pan can be correspondingly lowered.

Improvements and modifications of the present invention may occur to those skilled in the art which will come within the scope and spirit of the appended claim.

I claim:

A passenger vehicle having a frame, a front mounted engine and a rear mounted transmission-differential secured to said frame, a floor pan connected to said frame, a passenger seat mounted on said floor pan, a drive shaft extending rearwardly from said engine to said transmission-differential, a tubular plastic drive shaft housing resiliently mounted in a fixed location to the underside of said floor pan and extending from said engine to said transmission-differential, said tubular housing having a generally arcuate shape, the central region of said tubular housing being in vertical proximity to said passenger seat, said drive shaft being formed of flexible material and being concentrically situated within said tubular housing, resilient bearing means secured to said housing and rotatably supporting said shaft in an arcuate configuration corresponding to the configuration of said tubular housing, said tubular housing having its ends sealed so as to form a closed container, a lubricant contained within said tubular housing.

References Cited by the Examiner
UNITED STATES PATENTS

| | | | |
|---|---|---|---|
| 1,897,542 | 2/33 | West | 180—70 X |
| 2,067,287 | 1/37 | Pearce. | |
| 2,072,090 | 3/37 | Anderson | 64—1 |
| 2,168,108 | 8/39 | Bunau-Varilla | 180—70 X |
| 2,198,354 | 4/40 | Tjaarda | 180—73 |
| 2,963,106 | 12/60 | Sampietro | 180—70 |
| 3,037,573 | 6/62 | Larsen | 180—70 |

OTHER REFERENCES

Text: "Introduction to a Study of Mechanical Vibration," by G. W. Van Santen; published in 1953 by Philips Technical Library and distributed by Elsevier Press Inc., 402 Lovett Boulevard, Houston 6, Texas.

A. HARRY LEVY, *Primary Examiner.*

WILLIAM KANOF, GEORGE HYMAN, Jr., PHILIP ARNOLD, *Examiners.*